(12) United States Patent
Lu et al.

(10) Patent No.: US 11,140,271 B2
(45) Date of Patent: *Oct. 5, 2021

(54) APPARATUSES AND METHODS FOR DETERMINING USAGE OF A WIRELESS COMMUNICATION SERVICE

(71) Applicant: AT&T INTELLECTUAL PROPERTY I,L.P., Atlanta, GA (US)

(72) Inventors: Tingting Lu, Alpharetta, GA (US); Patrick Manno, Purcellville, VA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/139,680

(22) Filed: Sep. 24, 2018

(65) Prior Publication Data
US 2019/0037082 A1 Jan. 31, 2019

Related U.S. Application Data

(63) Continuation of application No. 14/963,519, filed on Dec. 9, 2015, now Pat. No. 10,116,805, which is a
(Continued)

(51) Int. Cl.
*G06Q 40/00* (2012.01)
*H04M 15/00* (2006.01)
(Continued)

(52) U.S. Cl.
CPC ............ *H04M 15/07* (2013.01); *G06Q 10/10* (2013.01); *G06Q 10/1091* (2013.01);
(Continued)

(58) Field of Classification Search
CPC ...... H04M 15/00; H04M 15/07; H04M 15/28; H04M 15/56; H04M 15/61; G06Q 30/00;
(Continued)

(56) References Cited

U.S. PATENT DOCUMENTS 5,197,094 A 3/1993 Tillery et al.
5,544,161 A 8/1996 Bigham et al.
(Continued)

OTHER PUBLICATIONS

U.S. Appl. No. 14/573,601, filed Dec. 17, 2014.
(Continued)

*Primary Examiner* — Russell S Glass
(74) *Attorney, Agent, or Firm* — Guntin & Gust, PLC; John G. Rauch (57) ABSTRACT

A method includes receiving, at a first network element of a network, a message to initiate a session of a communication service at a user device. The user device is associated with a plurality of billing accounts. The message includes a particular identifier of multiple identifiers associated with the user device. Each billing account of the plurality of billing accounts is associated with a respective identifier of the multiple identifiers. The method includes initiating the session via the first network element. The method also includes sending, from the first network element to a usage data processing system, a charge data record. The charge data record includes the particular identifier. The usage data processing system aggregates charge data records for the session from multiple network elements used during the session to enable the session to be billed to a particular billing account of the billing accounts corresponding to the particular identifier.

20 Claims, 7 Drawing Sheets

Related U.S. Application Data continuation of application No. 14/746,505, filed on Jun. 22, 2015, now Pat. No. 10,027,819, which is a continuation of application No. 12/179,922, filed on Jul. 25, 2008, now Pat. No. 9,064,275.

(51) Int. Cl.

| | |
|---|---|
| *G06Q 30/04* | (2012.01) |
| *G06Q 20/10* | (2012.01) |
| *G06Q 40/02* | (2012.01) |
| *G06Q 10/10* | (2012.01) |
| *G06Q 20/22* | (2012.01) |
| *H04W 4/24* | (2018.01) |
| *H04M 15/28* | (2006.01) |

(52) U.S. Cl.
CPC ......... *G06Q 20/102* (2013.01); *G06Q 20/227* (2013.01); *G06Q 30/04* (2013.01); *G06Q 40/00* (2013.01); *G06Q 40/02* (2013.01); *G06Q 40/10* (2013.01); *G06Q 40/123* (2013.12); *H04M 15/28* (2013.01); *H04M 15/56* (2013.01); *H04M 15/61* (2013.01); *H04W 4/24* (2013.01)

(58) Field of Classification Search
CPC .... G06Q 40/123; G06Q 20/227; G06Q 10/10; G06Q 40/00; G06Q 10/1091; G06Q 20/102; G06Q 40/10; G06Q 40/02; G06Q 30/04; H04W 4/24
USPC .......................................................... 705/34
See application file for complete search history.

(56) References Cited

U.S. PATENT DOCUMENTS

| | | | |
|---|---|---|---|
| 5,659,601 A | 8/1997 | Cheslog | |
| 5,682,325 A | 10/1997 | Lightfoot et al. | |
| 6,055,504 A | 4/2000 | Chou et al. | |
| 7,149,293 B1 | 12/2006 | Coppage et al. | |
| 7,280,847 B2 | 10/2007 | Goldthwaite et al. | |
| 7,289,489 B1 | 10/2007 | Kung et al. | |
| 7,315,891 B2 | 1/2008 | Donahue | |
| 7,689,716 B2 | 3/2010 | Short et al. | |
| 7,697,672 B2 | 4/2010 | Cesarini | |
| 7,760,711 B1 | 7/2010 | Kung et al. | |
| 7,877,086 B2 | 1/2011 | Jagadeesan et al. | |
| 8,112,062 B2 | 2/2012 | Pattabiraman | |
| 8,321,952 B2 | 11/2012 | Spalink et al. | |
| 8,346,225 B2 | 1/2013 | Raleigh | |
| 8,351,898 B2 | 1/2013 | Raleigh | |
| 8,386,351 B2 | 2/2013 | Karlsson | |
| 8,503,978 B2 | 8/2013 | Gaddam et al. | |
| 8,675,476 B2 | 3/2014 | Brownworth et al. | |
| 8,750,250 B2 | 6/2014 | Milam et al. | |
| 8,756,321 B2 | 6/2014 | Clark et al. | |
| 8,793,758 B2 | 7/2014 | Raleigh et al. | |
| 8,838,487 B1 | 9/2014 | Rieschick et al. | |
| 8,838,488 B1 | 9/2014 | Breau et al. | |
| 8,868,639 B2 | 10/2014 | Raleigh et al. | |
| 8,938,547 B1 | 1/2015 | Roberge et al. | |
| 9,015,166 B2 | 4/2015 | Chow | |
| 9,064,275 B1 | 6/2015 | Lu et al. | |
| 9,100,390 B1 | 8/2015 | Asnis et al. | |
| 9,106,538 B1 | 8/2015 | Asnis | |
| 9,232,012 B1 | 1/2016 | Roberge et al. | |
| 9,232,013 B1 | 1/2016 | Asnis | |
| 9,317,574 B1 | 4/2016 | Brisebois et al. | |
| 9,350,818 B2 | 5/2016 | Asnis | |
| 9,355,393 B2 | 5/2016 | Purves et al. | |
| 9,563,782 B1 | 2/2017 | Brisebois et al. | |
| 9,569,626 B1 | 2/2017 | Brisebois et al. | |
| 9,582,598 B2 | 2/2017 | Kalgi | |
| 9,641,555 B1 | 5/2017 | Brisebois et al. | |
| 9,686,415 B2 | 6/2017 | Haslestad et al. | |
| 9,779,260 B1 | 10/2017 | Brisebois et al. | |
| 10,116,805 B2 * | 10/2018 | Lu .......... | H04M 15/56 |
| 2003/0115316 A1 | 6/2003 | Yang-Huffman | |
| 2004/0098306 A1 | 5/2004 | Fitzpatrick et al. | |
| 2005/0255827 A1 | 11/2005 | Foster et al. | |
| 2006/0026669 A1 | 2/2006 | Zakas | |
| 2006/0026681 A1 | 2/2006 | Zakas | |
| 2006/0104214 A1 | 5/2006 | Borella | |
| 2006/0155854 A1 | 7/2006 | Selgert | |
| 2006/0174037 A1 | 8/2006 | Bernardi et al. | |
| 2007/0201642 A1 | 6/2007 | Cesarini | |
| 2007/0206515 A1 | 9/2007 | Andreasen et al. | |
| 2007/0232322 A1 | 10/2007 | Jagadeesan et al. | |
| 2008/0052206 A1 * | 2/2008 | Edwards ................ | G06Q 20/14 |
| | | | 705/34 |
| 2008/0080374 A1 | 4/2008 | Nuzman et al. | |
| 2008/0085707 A1 | 4/2008 | Fadell | |
| 2008/0096590 A1 | 4/2008 | Celik et al. | |
| 2008/0114690 A1 | 5/2008 | Skidmore et al. | |
| 2008/0154625 A1 | 6/2008 | Sebanescu | |
| 2009/0061816 A1 | 3/2009 | Ergezinger et al. | |
| 2009/0149154 A1 | 6/2009 | Bhasin | |
| 2009/0182873 A1 | 7/2009 | Spalink et al. | |
| 2009/0325582 A1 | 12/2009 | Jagadeesan et al. | |
| 2011/0040663 A1 | 2/2011 | Cai et al. | |
| 2011/0231280 A1 | 9/2011 | Farah | |
| 2011/0255688 A1 | 10/2011 | Spalink et al. | |
| 2012/0020218 A1 | 1/2012 | Li et al. | |
| 2012/0041851 A1 | 2/2012 | Tan | |
| 2012/0069748 A1 | 3/2012 | Van Den Bogaert | |
| 2012/0088470 A1 | 4/2012 | Raleigh | |
| 2012/0289147 A1 | 11/2012 | Raleigh et al. | |
| 2012/0330804 A1 * | 12/2012 | Morrill ................ | H04M 15/80 |
| | | | 705/34 |
| 2013/0132854 A1 | 5/2013 | Raleigh et al. | |
| 2013/0157663 A1 | 6/2013 | Brownworth et al. | |
| 2013/0231080 A1 | 9/2013 | Cheuk et al. | |
| 2013/0238777 A1 | 9/2013 | Raleigh et al. | |
| 2013/0258949 A1 | 10/2013 | Bari et al. | |
| 2013/0286875 A1 | 10/2013 | Morrill | |
| 2013/0316703 A1 | 11/2013 | Girard et al. | |
| 2014/0095690 A1 | 4/2014 | Saker et al. | |
| 2014/0098671 A1 | 4/2014 | Raleigh et al. | |
| 2014/0112299 A1 | 4/2014 | Frank et al. | |
| 2014/0179266 A1 | 6/2014 | Schultz et al. | |
| 2014/0199963 A1 | 7/2014 | Mohebbi | |
| 2014/0273933 A1 | 9/2014 | Sharma et al. | |
| 2014/0289383 A1 | 9/2014 | Draznin et al. | |
| 2015/0109967 A1 | 4/2015 | Hogan et al. | |
| 2015/0294377 A1 | 10/2015 | Chow | |
| 2016/0092869 A1 | 3/2016 | Salama et al. | |

OTHER PUBLICATIONS

U.S. Appl. No. 14/608,662, filed Jan. 29, 2015.
U.S. Appl. No. 14/615,799, filed Feb. 6, 2015.
U.S. Appl. No. 14/802,701, filed Jul. 17, 2015.
U.S. Appl. No. 14/816,385, filed Aug. 3, 2015.
U.S. Appl. No. 14/822,150, filed Aug. 10, 2015.
Lim, A., "Can I put two SIM cards in one mobile phone?"; Jun. 29, 2006, Retrived from http://www.cnet.com/news/can-i-put-two-sim-cards-in-one-mobile-phone/, 2 pages.
Beirne, M., "Using an ATM to Hit a Bull's Eye"; Financial Services Online, Jan./Feb. 1998, 4 pages.
Christianson, R., "Billing large: What do C&I customers want?"; Public Utilities Fortnightly, Suppl. Information Technology; The Competitive Edge (Fall 1999), pp. 36-44.

* cited by examiner

| Unified Usage Record (UUR) 400 | | | | | |
|---|---|---|---|---|---|
| Transaction ID 402 | Service Type 404 | Public User ID 406 | Device Type 408 | Provider ID 410 | Additional Parameters 412 |

APPARATUSES AND METHODS FOR DETERMINING USAGE OF A WIRELESS COMMUNICATION SERVICE

PRIORITY CLAIM

The present application claims priority from, and is a continuation of, U.S. patent application Ser. No. 14/963,519, filed Dec. 9, 2015, which is a continuation of U.S. patent application Ser. No. 14/746,505, filed Jun. 22, 2015, now U.S. Pat. No. 10,027,819, which is a continuation of U.S. patent application Ser. No. 12/179,922, filed Jul. 25, 2008, now U.S. Pat. No. 9,064,275, each of which is incorporated by reference herein in its entirety.

TECHNICAL FIELD

The present disclosure relates generally to usage of a wireless communication service.

BACKGROUND

IMS (Internet Protocol Multimedia Subsystem) is a standardized service delivery architecture that provides IP-based mobile and fixed multimedia services to IMS subscribers. IMS allows operators of different network types with varying architecture to offer the same services to all of their subscribers.

IMS subscribers, typically, access an IMS network via an access network using a UE (User Equipment). A UE is a device that has IP connectivity and is capable of requesting an IP address from the IMS network. A UE negotiates QoS (Quality of Service) requirements and other capabilities during a communication session setup process. Typically, a UE can negotiate the media type, traffic direction, bit rate, packet size, and bandwidth, for example.

Each IMS subscriber can be assigned a Private User Identity by the home IMS operator. A Private User Identity can be in the format of a NAI (Network Access Identifier), such as "username@operator.com." A Private User Identity can be used to identify a subscription and authenticate a subscription. Each Private User Identity can be associated with one or more PUIDs (Public User Identifications) that are allocated by the home IMS operator.

An IMS communications session includes session management control connections for session control signaling and media flow connections for media flow between two or more IMS subscribers. IMS subscribers can use a variety of IP-based services in a single communication session.

SUMMARY

According to one aspect of the present disclosure, a method for operating a usage data processing system in a converged communications network can include receiving usage data from one or more network elements. The usage data can be associated with one or more public user identifications that can be used to charge and bill for service provided to one or more users. The method can further include processing the usage data to generate a unified usage record. The method can further include sending the unified usage record to a charging system that is configured to charge for the service based upon the one or more public user identifications.

In some embodiments, the usage data can be unformatted usage data. In other embodiments, the usage data can be formatted in a charging data record format. In some embodiments, processing the usage data to generate the unified usage record can include preparing the usage data to be formatted in a unified usage record format and formatting the usage data into the unified usage record format. In some embodiments, the converged communications network is an IMS network and the one or more network elements are one or more IMS network elements. In some embodiments, the one or more public user identifications can be assigned to one or more persona profiles.

According to another aspect of the present disclosure, a method for operating a charging system in a converged communications network can include receiving a unified usage record from a usage data processing system. The unified usage record can include one or more public user identifications and usage data collected from one or more network elements and processed by the usage data processing system to generate the unified usage record. The method can further include generating a charge for the unified usage record and sending the charge to a billing system for billing the charge based upon the one or more public user identifications.

In some embodiments, generating the charge for the unified usage record can include generating the charge for the unified usage record based upon a charge rate. In some embodiments, the converged communications network is an IMS network and the one or more network elements is one or more IMS network elements. In some embodiments, the one or more public user identifications is assigned to one or more persona profiles.

According to another aspect of the present disclosure, a method for operating a billing system in a converged communications network can include receiving a charge from a charging system. The charge can identify one or more accounts are associated with one or more public user identifications that can be used to bill for service provided to one or more users. The method can further include applying the charge to the one or more accounts.

In some embodiments, the method can further include generating an invoice and sending the invoice to the one or more users, wherein the invoice reflect the charge. In some embodiments, the converged communications network is an IMS network. In some embodiments, the one or more public user identifications are assigned to one or more persona profiles.

According to another aspect of the present disclosure, a billing system for billing services provided in a converged communications network can include one or more processors and one or more memory in communication with the processor. The memory can be configured to store instructions, executable by the processor to receive a charge from a charging system. The charge can identify one or more accounts associated with one or more public user identifications that can be used to bill for service provided to one or more users. The memory can be further configured to store instructions to apply the charge to the one or more accounts.

In some embodiments, the billing system memory can be further configured to store instructions, executable by the processor to generate an invoice and send the invoice to the one or more users, wherein the invoice reflects the charge. In some embodiments, the converged communications network is an IMS network.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
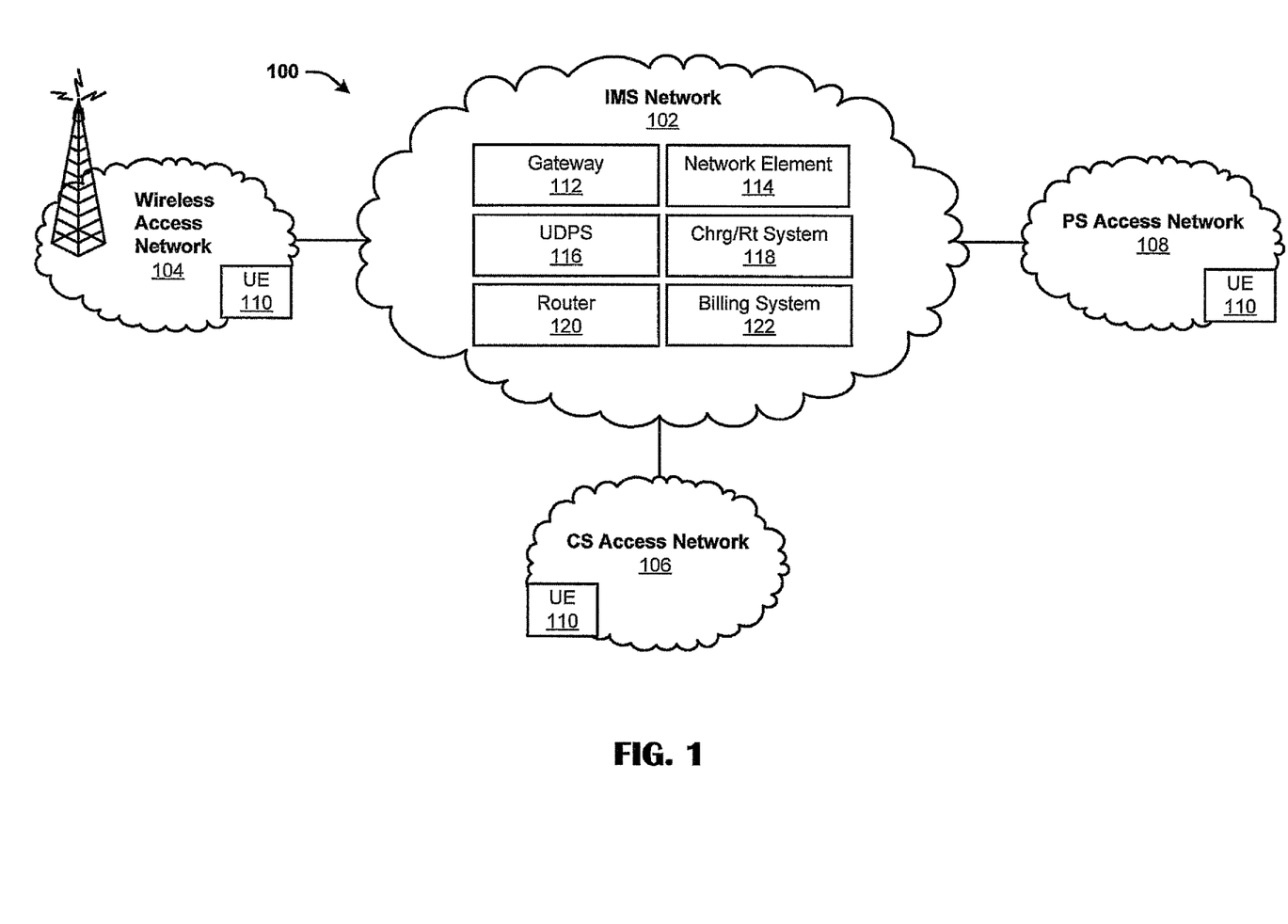
FIG. 1 schematically illustrates a portion of a communications network, according to some exemplary embodiments of the present disclosure.

Referring now to the drawings wherein like numerals represent like elements throughout the drawings, FIG. 1 illustrates a portion of a communications network 100, according to an exemplary embodiment of the present disclosure. The illustrated communications network 100 includes an IMS (Internet Protocol Multimedia Subsystem) network 102 that is accessible via a wireless access network 104, a circuit-switched access network 106, and a packet-switched access network 108 via one or more UEs (User Equipments) 110. For purposes of clarity and brevity, the access networks 104, 106, 108 and the IMS network 102 are presented as single networks, although this is not necessarily the case. In implementation, multiple wireless access networks 104, multiple circuit-switched access networks 106, and/or multiple packet-switched access networks 108 can be used to access one or more IMS networks 102. The access networks 104, 106, 108 and/or the IMS network(s) 102 can be operated by one or more network operators, carriers, or service providers, for example.

As used herein, a UE 110 can include a device that is capable of accessing the IMS network 102 via IP (Internet Protocol) or other packet-based protocol. The UE 110 can include, for example, a VoIP (Voice over IP) phone, SIP (Session Initiation Protocol) phone, a telephone, a mobile phone, a cellular phone, an IP television, a computer, a personal digital assistant, a facsimile machine, or other communications device that is capable of communicating with one or more of the access networks 104, 106, 108 to access the IMS network 102.

Generally, the UE 110 can include a transceiver for communicating with an access network 104, 106, 108 and a processor for executing instructions, such as to operate one or more applications stored in a memory. The memory can include a variety of computer readable media, including volatile media, non-volatile media, removable media, and non-removable media. The memory, for example, can be configured to store one or more persona profiles.

An IMS subscriber can be identified by a private user ID and one or more PUIDs (Public User Identifications) can be associated with the private user ID. A persona profile can be associated with a PUID that is allocated by the IMS network 102 operator, for example.

Multiple PUIDs can be mapped to a persona profile or multiple persona profiles can be mapped to a PUID. Multiple PUIDs that are associated with a single UE 110 can be used to bill different accounts for services accessed via the UE 110. A persona profile can be identified by an operator-assigned name or a subscriber-assigned name.

By way of example and not limitation, one persona profile can be named "work" and another persona profile can be named "personal." The "work" persona profile can be associated with a first PUID, for example, PUID-A, and the "personal" persona profile can be associated with a second PUID, for example, PUID-B. An IMS subscriber can select the "work" persona profile stored on the UE 110 to notify the IMS network 102 to rate, charge, and bill an account that is associated with PUID-A. Likewise, if the IMS subscriber wants to charge a personal account for services, the IMS subscriber can select the "personal" persona profile to notify the IMS network 102 to rate, charge, and/or bill an account that is associated with the PUID-B.

By way of another example and not limitation, one or more IMS subscribers can share an IMS access line and/or UE 110 and can be billed separately based upon the persona profile (PUID) used to access the IMS network 102.

A PUID can be, for example, a SIP URI (Uniform Resource Identifier) or a TEL (Telephone) URL (Uniform Resource Locator). A PUID that includes a SIP URI can take the form of "sip:first.last@operator.com" where "first" is the first name of the user, "last" is the last name of the user, and "operator" is the IMS network 102 operator. A PUID that includes a TEL URL can represent a telephone number and can take the form of "tel:+1-555-555-2368." A TEL URL can be formatted in accordance with any telephone numbering plan. A telephone number can be included in a SIP URI and can take the form of "sip:+1-555-555 2368@operator.com;user=phone." A TEL URL can be required for interworking a PSTN telephone.

The IMS network 102 can be configured in accordance with 3GPP specifications, although this is not necessarily the case. The IMS network 102 provides IP-based mobile and fixed single media and multimedia communication services for the UEs 110. The IMS network 102 is access network 104, 106, 108 independent. Each of the access networks 104, 106, 108 can provide access to services offered via the IMS network 102.

A gateway 112 can include interworking functions to allow communication between circuit-switched networks, such as the circuit-switched access network 106, and the IMS network 102. For example, the gateway 112 can provide access for circuit-switched access networks 106, signaling networks, such as SS7 (Signaling System Number 7), and POTS (Plain Old Telephone Service) networks, such as a PSTN (Public Switched Telephone Network).

The illustrated IMS network 102 includes elements that provide data collection, data mediation, charging, rating, billing, and routing functions of the present disclosure. For the sake of brevity and clarity, 3GPP elements, such as a CSCF (Call Session Control Function), a HSS (Home Subscriber Server), an AS (Application Server), and other 3GPP elements, are not specifically illustrated so as not to obscure the present disclosure. It should be understood, however, that these and other elements can be included in the network elements 114.

The wireless access network 104 can provide access to the IMS network 102 via wireless technologies, such as, but not limited to, GSM (Global System for Mobile communications), CDMA (Code Division Multiple Access), UMTS (Universal Mobile Telecommunications System) network, and provide data communications via EDGE (Enhanced Data rate for Global Evolution), the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+(Evolved HSPA), for example. The wireless access network 104 is also compatible with future wireless technologies including, but not limited to, pre-4G and 4G standards, for example. Other wireless access technologies are contemplated. Accordingly, the UE 110 can be a mobile device, such as a mobile device 200 illustrated in FIG. 2, that is configured to operate using one or more of the aforementioned technologies.

The circuit-switched access network 106 can provide access to the IMS network 102 via circuit-switched technologies, such as POTS, for example. The circuit-switched access network 106 can communicate with the IMS network 102 via the gateway 112. A UE 110 in communication with the circuit-switched access network 106 can be a POTS telephone, for example.

The packet-switched access network 108 can provide access to the IMS network 102 via packet-switched technologies. The packet-switched access network 108 can include the Internet or other PDN (Public Data Network), for example. A UE 110 in communication with the packet-switched access network 108 can include a computer, an IP television, a VoIP telephone, a SIP telephone, or other UE 110, for example.

The illustrated IMS network 102 includes a gateway 112, as described above, one or more network elements 114, one or more UDPSs (Usage Data Processing Systems) 116, one or more charging and rating systems 118, one or more routers 120, and one or more billing systems 122. Each of the IMS network 102 elements and systems are now described.

The one or more network elements 114 can include, but is not limited to, P-CSCFs (Proxy Call Session Control Functions), I-CSCFs (Interrogating Call Session Control Functions), S-CSCFs (Serving Call Session Control Functions), BGCFs (Breakout Gateway Control Functions), MRFCs (Media Resource Control Functions), MGCFs (Media Gateway Control Functions), AS's (Application Servers) that can be used in a communication session. The one or more network elements 114 can send raw usage data directly to the UDPS 116. The UDPS 116 can process and format the raw usage data into a UUR (Unified Usage Record) format. An exemplary UUR 400 is illustrated and described in more detail below with reference to FIG. 4. Alternatively, the network elements 114 can include charging functions to collect charging information and generate CDRs (Charging Detail Records or Call Detail Records) based upon the charging information. The network elements 114 can send the CDRs to the UDPS 116 for processing and for formatting the CDRs into a UUR format. An exemplary UDPS 116 is described in more detail below with reference to FIG. 3.

The charging and rating system 118 can include one or more rating modules and one or more charging modules. Rating modules can rate transactions based upon the service type(s) provided by the IMS network 102. Transactions can include multiple service segments and each service segment can be rated differently. Charging modules can generate charges based upon the rate provided by rating modules. The charging and rating system 118 can send the charge to a router 120. The router 120 can route the charge to the appropriate billing system 122 based upon routing rules used to analyze the PUID and to send the charge to the billing system 122 that performs billing functions for the IMS subscriber account that is associated with the PUID.

Figure 2:
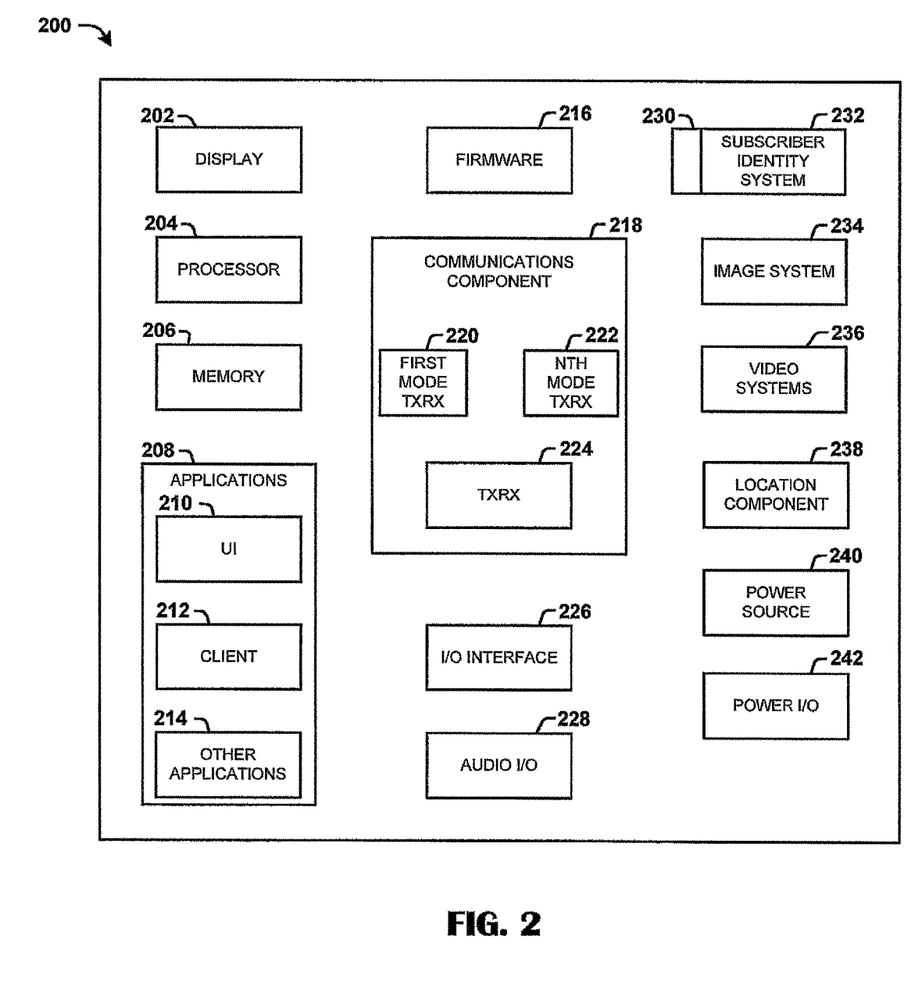
FIG. 2 schematically illustrates a mobile device and components thereof for use in accordance with some exemplary embodiments of the present disclosure.

FIG. 2 is a schematic block diagram illustrating an exemplary mobile device 200 for use in accordance with some exemplary embodiments of the present disclosure. Although no connections are shown between the components illustrated and described in FIG. 2, the components can interact with each other to carry out device functions.

As illustrated, the mobile device 200 can be a multimode handset. FIG. 2 and the following discussion are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The mobile device 200 is an example of one UE 110 that could be used to access the wireless access network 104, however, components described herein with reference to the mobile device 200 can be applicable to other UE types, such as a computer, IP television, VoIP telephone, SIP phone, and the like. As such, the description of the mobile device 200 is intended to apply to other UE types, where applicable.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like. The present disclosure can include application for selecting and accessing persona profiles stored on the UE 110.

The illustrated mobile device 200 includes a display 202 for displaying multimedia, such as, for example, text, images, video, telephony functions, caller line ID data, setup functions, menus, music metadata, messages, wallpaper, graphics, persona profiles, and the like. The device 200 can include a processor 204 for controlling, processing data, and/or executing instructions stored in a memory 206. The memory 206 can interface with the processor 204 for the storage of data and/or applications 208. The memory 206 can include a variety of computer readable media, including volatile media, non-volatile media, removable media, and non-removable media. Computer-readable media can include device storage media and communication media. Storage media can include volatile and/or non-volatile, removable and/or non-removable media, such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 200.

The memory 206 can be configured to store one or more applications 208. The applications 208 can include a user interface (UI) application 210. The UI application 210 can interface with a client 212 (e.g., an operating system) to facilitate user interaction with device functionality and data, for example, selecting persona profiles, managing persona profiles, answering/initiating calls, entering/deleting data, configuring settings, address book manipulation, multimode interaction, music interaction, video interaction, and the like. The applications 208 can include other applications 214 such as, for example, persona profile software, add-ons, plug-ins, voice recognition software, call voice processing, voice recording, messaging software, e-mail software, video processing software, image processing software, music playback software, combinations thereof, and the like, as well as subsystems and/or components. The applications 208 can be stored in the memory 206 and/or in a firmware 216, and can be executed by the processor 204. The firmware 216 can also store code for execution during initialization of the device 200. The memory 206, applications 208, and/or firmware 216 can be configured to store one or more PUIDs.

A communications component 218 can interface with the processor 204 to facilitate wired/wireless communications with external systems including, for example, the wireless access network 104, the circuit-switched access network 106, and/or the packet-switched access network 108. The communications component 218 can generally provide access to cellular networks, VoIP networks, LAN, WAN, MAN, PAN, that can be implemented using WiFi, WiMax, combinations and/or improvements thereof, and the like. The communications component 218 can also include a multimode communications subsystem for providing cellular communications via different cellular technologies. For example, a first cellular transceiver 220 can operate in one mode, for example, GSM, and an Nth transceiver 222 can operate in a different mode, for example UMTS. While only two transceivers 220, 222 are illustrated, it should be appreciated that a plurality of transceivers can be included. The communications component 218 can also include a transceiver 224 for unlicensed RF communications using technology such as, for example, WiFi, WiMAX, NFC, other RF and the like. The transceiver 224 can also be configured for line-of-sight technologies, such as, for example, infrared and IRDA. Although a single transceiver 224 is illustrated multiple transceivers for unlicensed RF and line-of-sight technologies are contemplated.

The communications component 218 can also facilitate communications reception from terrestrial radio networks, digital satellite radio networks, Internet-based radio services networks, combinations thereof, and the like. The communications component 218 can process data from a packet-based access network 108, such as, for example, the Internet, a corporate intranet, a home broadband network, and the like, via an ISP, DSL provider, or other broadband service provider.

An input/output (I/O) interface 226 can be provided for input/output of data and/or signals. The I/O interface 226 can be a hardwire connection, such as, for example, a USB, PS2, IEEE 1394, serial, parallel, IEEE 802.3 (e.g., Ethernet-RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like. The I/O interface 226 can be used to select a persona profile.

Audio capabilities can be provided by an audio I/O component 228 that can include a speaker (not shown) for the output of audio signals and a microphone (not shown) to collect audio signals.

The device 200 can include a slot interface 230 for accommodating a subscriber identity system 232, such as, for example, a SIM or universal SIM (USIM). The subscriber identity system 232 instead can be manufactured into the device 200, thereby obviating the need for a slot interface 230.

The device 200 can include an image capture and processing system 234. Photos and/or videos can be obtained via an associated image capture subsystem of the image system 234, for example, a camera. The device 200 can also include a video systems component 236 for processing, recording, and/or transmitting video content.

A location component 238 can be included to send and/or receive signals, such as, for example, GPS data, assisted GPS data, triangulation data, combinations thereof, and the like. The device 200 can use the received data to identify its location or can transmit data used by other devices to determine the device 200 location.

The device 200 can include a power source 240 such as batteries and/or other power subsystem (AC or DC). The power source 240 can be single-use, continuous, or rechargeable. In the case of the latter, the power source 240 can interface with an external power system or charging equipment via a power I/O component 242.

Figure 3:
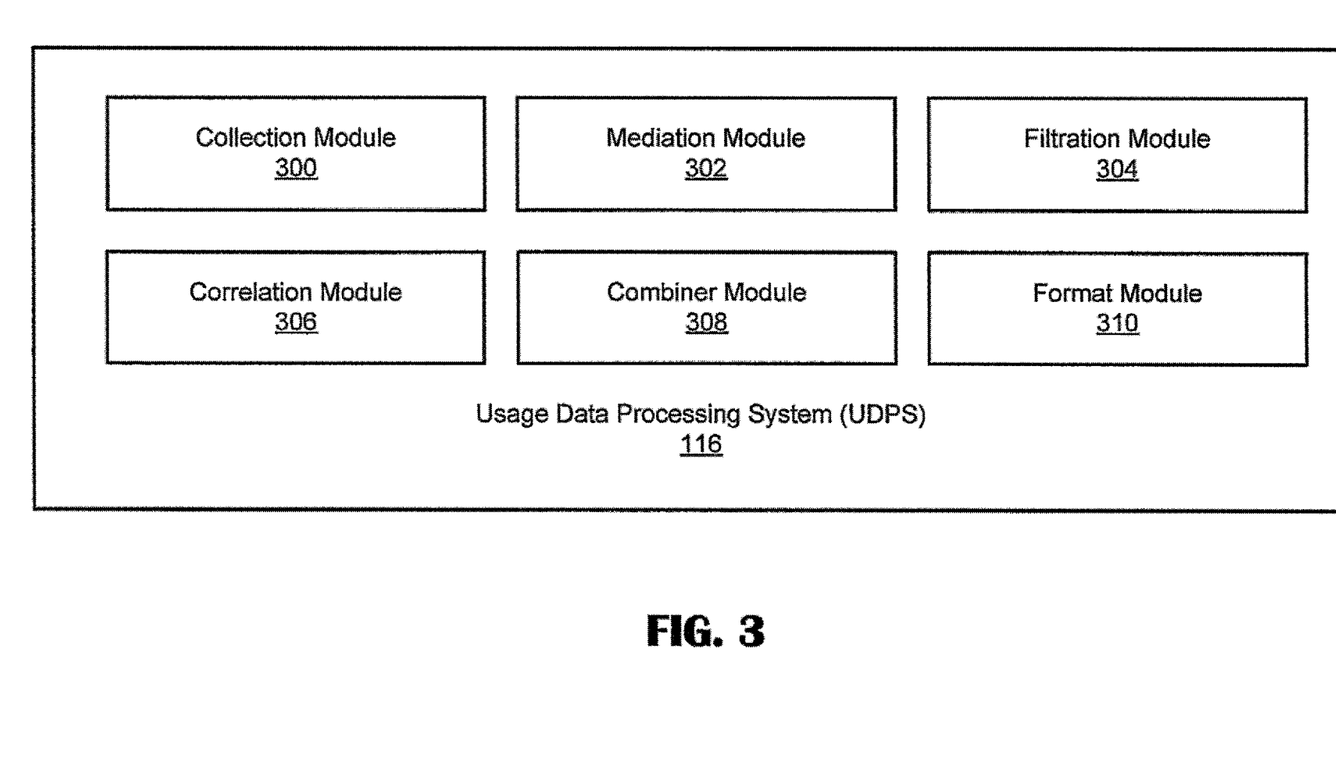
FIG. 3 schematically illustrates a usage data processing system and components thereof for use in accordance with some exemplary embodiments of the present disclosure.
Figure 4:
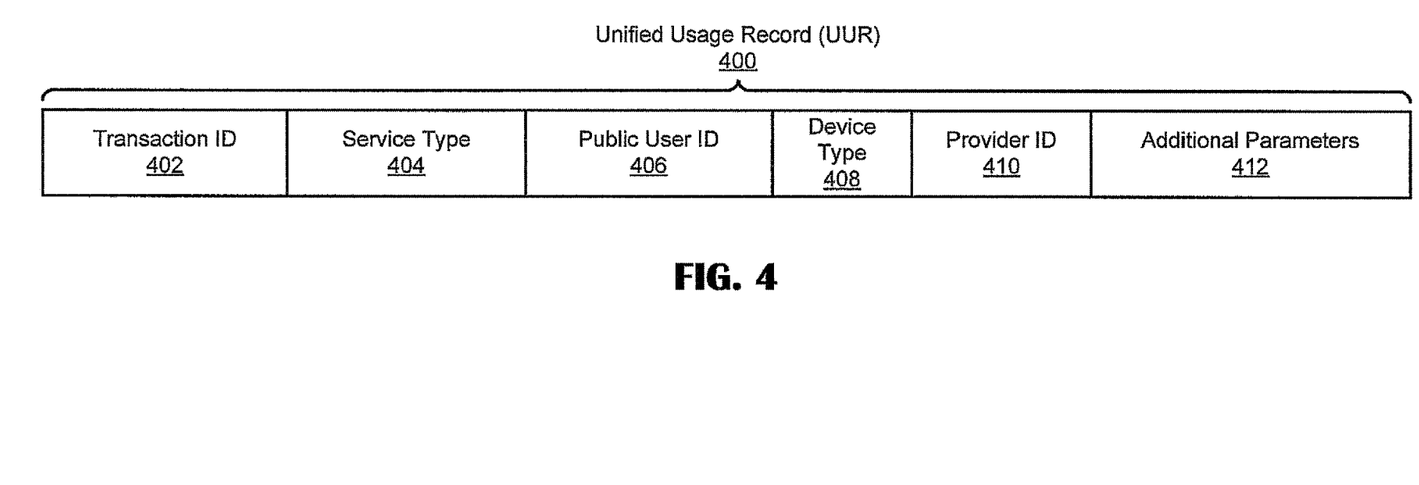
FIG. 4 schematically illustrates a unified usage record, according to some exemplary embodiments of the present disclosure.

Referring now to FIG. 3, a UDPS (Usage Data Processing System) 116 and components thereof are illustrated for use in accordance with some exemplary embodiments of the present disclosure. The UDPS 116 can be configured to collect, mediate, filter, correlate, combine, and/or format usage information and/or CDRs received from the network elements 114 to a UUR format. Accordingly, the illustrated UDPS 116 includes a collection module 300, a mediation module 302, a filtration module 304, a correlation module 306, a combiner module 308, and a format module 310 that can perform corresponding functions for the UDPS 116 to create a UUR, such as a UUR 400 as illustrated in FIG. 4 and described below with reference thereto. Each module 302, 304, 306, 308, 310 can include a memory that is configured to store instructions, such as an algorithm, that can be executed by a processor to perform the corresponding functions. All or some of the modules may be needed to aggregate usage data into a UUR format. Alternatively, a single processor and memory system can be configured to perform some or all functions of the illustrated modules 300, 302, 304, 306, 308, 310.

The collection module 300 can be configured to collect raw usage data and/or usage date formatted in one or more CDRs received from the network elements 114. The mediation module 302 can be configured to convert data from one data format to another data format such that the data can be further processed. The filtration module 304 can be configured to filter usage data. The correlation module 306 can be configured to correlate usage data from multiple CDRs. The combiner module 308 can be configured to combine correlated usage data. The format module 310 can be configured to format the usage data into a UUR format, such as the UUR 400 described immediately below.

Referring now to FIG. 4, a UUR 400 is illustrated, according to an exemplary embodiment of the present disclosure. The illustrated UUR 400 includes a transaction ID field 402, a service type field 404, a PUID field 406, a device type field 408, a provider ID field 410, and an additional parameters field 412. It should be understood that some or all of the fields 402, 404, 406, 408, 410, 412 may be mandatory or optional.

The transaction ID field 402 can include a transaction ID that is used to correlate CDRs that are generated for the same transaction. For example, although different network elements 114 may be used in each service segment of a communication session, a unique transaction ID can identify each service segment as being associated with the same transaction.

The service type field 404 can include at least one service type that is used for a given transaction ID. For transactions that include multiple service segments and thus multiple service types, those service types can be listed in the service type field 404. A rating module can use the service type as one criterion for determining the charge rate for a given transaction ID.

The PUID field 406 can include the PUID used in the communication session that is to be rated, charged, and billed. The PUID can also be used to direct any charges identified for the UUR 400 to the IMS subscriber's account that is stored in one of the billing systems 122.

A device type in the device type field 408 can identify the device type of the UE 110 used in the communication session. A service may be rated differently based upon the device type used.

A provider ID in the provider ID field 410 can identify the service provider, operator, or third party that provides the service identified by the service type 404. Additional parameters 412 can be defined for a UUR 400 as determined by the service provider, an IMS subscriber, or third party, for example.

Figure 5:
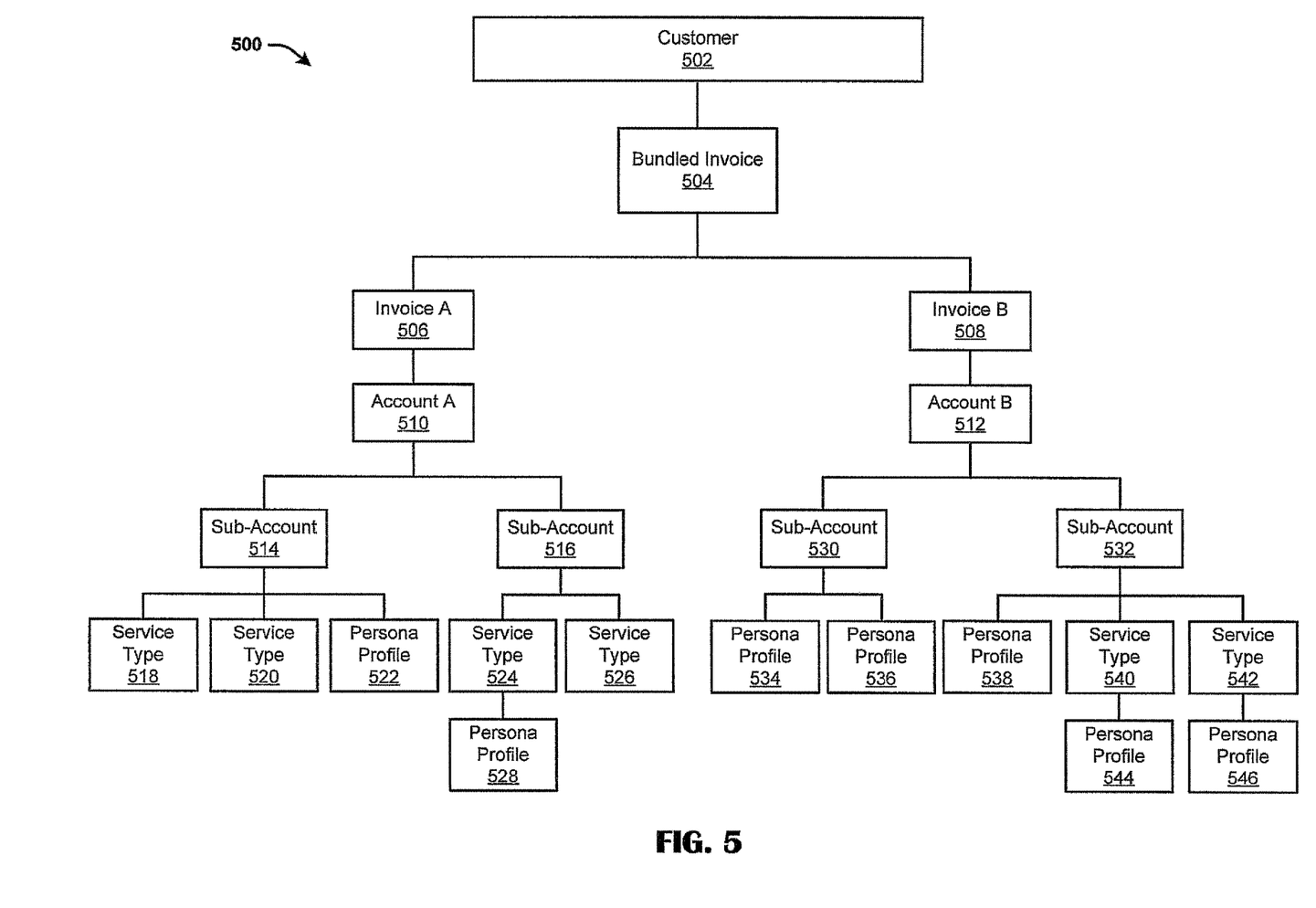
FIG. 5 schematically illustrates an account structure, according to some exemplary embodiments of the present disclosure.

Referring now to FIG. 5, an account structure 500 is illustrated, according to some exemplary embodiments of the present disclosure. By the illustrated embodiment no limits or restrictions are imposed upon the number of bundled invoices, invoices, accounts, sub-accounts, service types, and/or persona profiles that can or should be used in any implementation of the present disclosure. Numerous bundled invoices, invoices, accounts, sub-accounts, service types, and/or persona profiles are contemplated.

The illustrated account structure 500 is presented as a hierarchical structure beginning with a hypothetical customer 502 who is an IMS subscriber. The customer 502 can operate one or more UEs 110 to access, via one or more access networks 104, 106, 108, services provided by the IMS network 102. A billing system, such as the billing system 122, can generate and send a bundled invoice 504 to the customer 502 via known invoice delivery methods, for example, mail, electronic mail, and/or a website. The bundled invoice 504 can include two or more invoices, illustrated as invoice A 506 and invoice B 508. Alternatively, separate invoices for invoice A 506 and invoice B 508 can be generated and sent to the customer 502. Each invoice 506, 508 can be associated with one or more accounts. In the illustrated example, account A 510 is associated with invoice A 506 and account B 512 is associated with invoice B 508. Account A 510 and account B 512 can be associated with one or more service accounts. By way of example and not limitation, account A 510 is described as a work account and account B 512 is described as a personal account that are each associated with the same customer 502.

The illustrated account A 510 branches to two sub-accounts, a first sub-account 514 and a second sub-account 516. It is contemplated that any number of sub-accounts can branch from an account or, alternatively, an account can branch directly to one or more service types and/or persona profiles. In the illustrated embodiment, however, the first sub-account 514 branches to two service types, a first service type 518 and a second service type 520, and to a first persona profile 522. The service types 518, 520 can be any fixed or mobile communications service provided by the IMS network 102. A persona profile can be associated with a PUID. In the illustrated embodiment, each service type 518, 520 can define a different service billed under the first sub-account 514. Also in the illustrated embodiment, the persona profile 522 can be viewed as a billable item for any services provided under that persona profile 522.

The illustrated second sub-account 516 branches to two service types, a third service type 524 and a fourth service type 526. It should be understood that the illustrated service types 518, 520, 524, and 526 can be different service types or the same service types. As described above, each service type can be a fixed or mobile communications service provided by the IMS network 102. In the illustrated embodiment, a second persona profile 528 branches from the third service type 524. The second persona profile 528 can be assigned to one or more PUIDs that can be used as a billable item for that service type, for example.

Like account A 510, the illustrated account B 512 branches to two sub-accounts, in particular, a third sub-account 530 and a fourth sub-account 532. The third sub-account 530 branches to two persona profiles, a third persona profile 534 and a fourth persona profile 536. The persona profiles 534, 536 can be viewed as a billable item for any services provided under the selected persona profile. The fourth sub-account 532 branches to a fifth persona profile 538, a fifth service type 540, and a sixth service type 542. The fifth service type 540 can branch to a sixth persona profile 544 and the sixth service type 542 can branch to a seventh persona profile 546. It should be understood that the illustrated service types 540, 542 can be different service types or the same service types.

Figure 6:
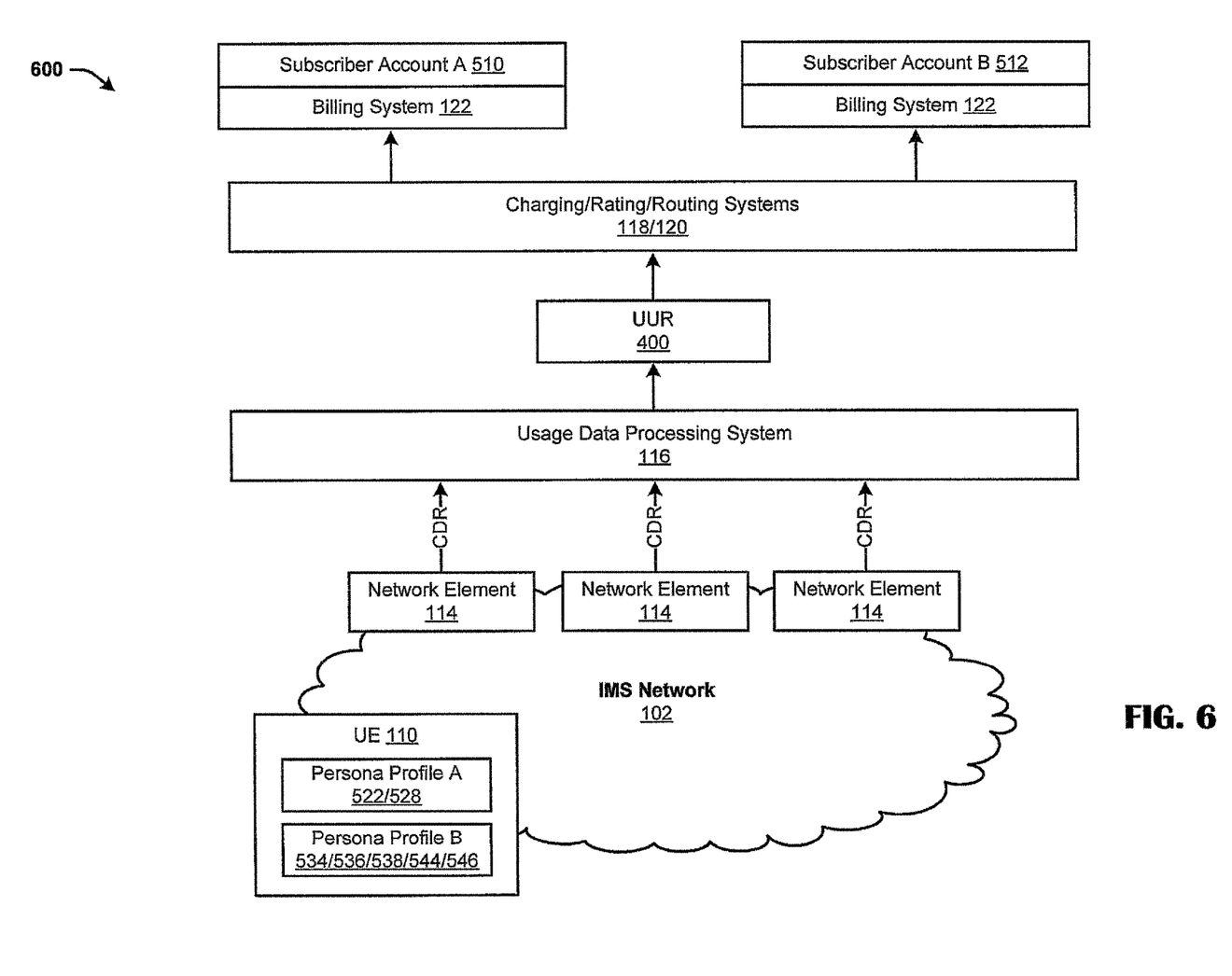
FIG. 6 schematically illustrates a network architecture, according to some exemplary embodiments of the present disclosure.

Referring now to FIG. 6, a network architecture 600 is illustrated, according to an exemplary embodiment of the present disclosure. A UE 110 can include one or more persona profiles 522, 528, 534, 536, 538, 544, 546, for example. In the illustrated example, two persona profiles, persona profile A 522, 528 and persona profile B 534, 536, 538, 544, 546 are illustrated. By way of example and not limitation, persona profile A can include one of the persona profiles illustrated under account A 510 as illustrated in FIG. 5, such as persona profiles 522, 528, and persona profile B can include one of the persona profiles illustrated under account B 508, such as persona profiles 534, 536, 538, 544, 546. An IMS subscriber can select a persona profile and initiate a communication session with the IMS network 102 via an access network 104, 106, 108. The PUID that is associated with the selected persona profile can be inserted into the communication session. Any network element 114 that contributes to the setup, maintenance, and/or teardown of the communication session can generate a CDR and/or raw usage data and sent the CDR to the UDPS 116 for processing. The UDPS 116 can process the data and format the data into a single UUR 400. The UUR 400 can be sent to the charging/rating/routing systems 118, 120. The UUR 400 can be rated and a charge can be routed to the appropriate billing system 122 based upon the PUID that corresponds to the selected persona profile. The billing system 122 can apply the proper subscriber account with the charge, for example, account A 510 or account B 512.

Figure 7:
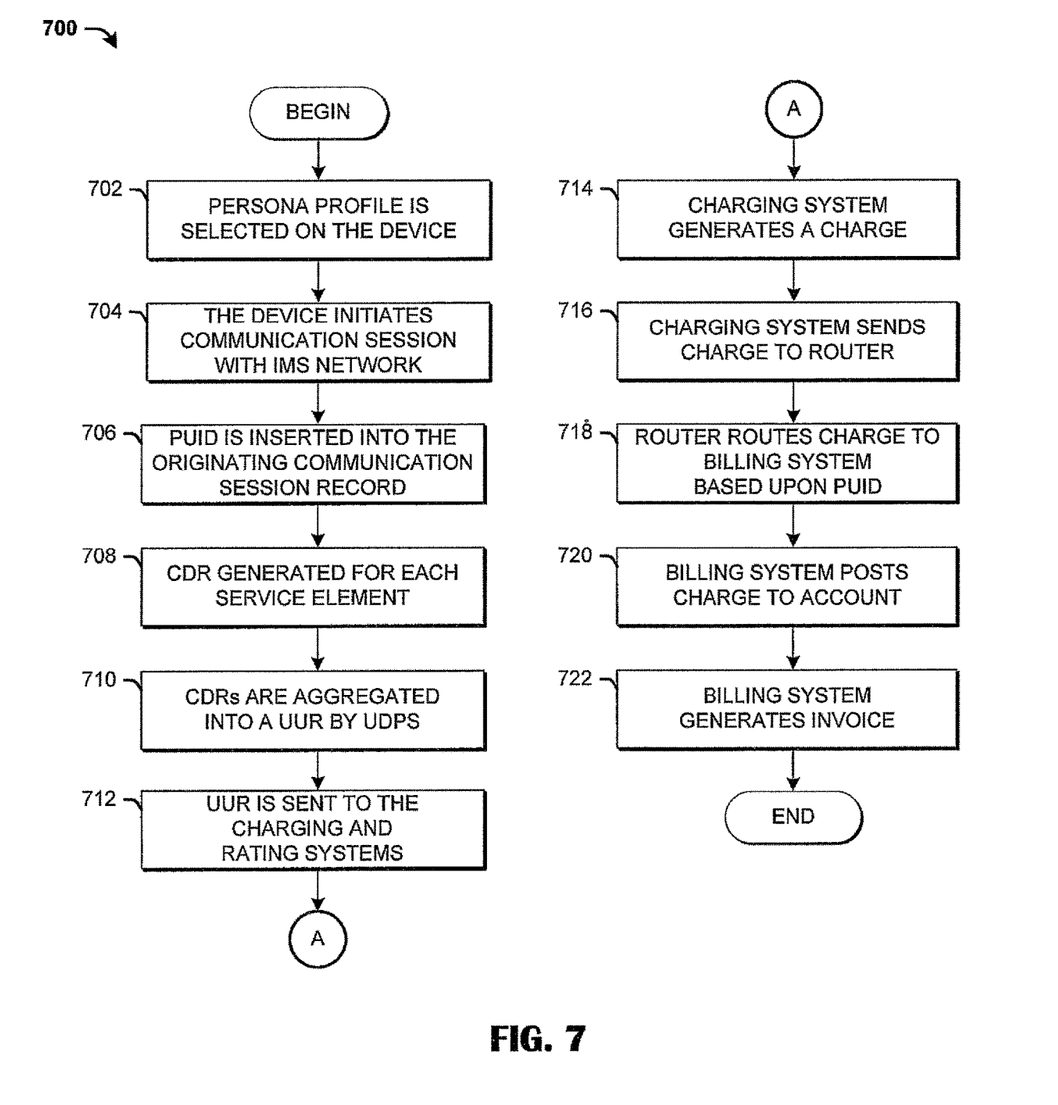
FIG. 7 schematically illustrates a method for charging and billing based upon a public user identification, according to some exemplary embodiments of the present disclosure.

Referring now to FIG. 7, a method 700 for charging and billing based upon a PUID is illustrated, according to some exemplary embodiments of the present disclosure. The method 700 is described with reference to FIG. 6. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated process 700 can be ended at any time. Some or all steps of this process, and/or substantially equivalent steps, can be performed by execution of computer-readable instructions stored on a computer-readable memory.

The illustrated method 700 begins and flow proceeds to block 702, wherein a persona profile, such as one of the persona profiles illustrated in FIG. 6 and described immediately above, is selected on a UE 110. Selection of a persona profile can instruct the UE 110 to initiate any future communication sessions with the IMS network 102 using the PUID that is associated with the selected persona profile. By way of example and not limitation, the selected persona profile can be persona profile A 522, 528 or persona profile B 534, 536, 538, 544, 546, as illustrated in FIG. 5 and FIG. 6. Accordingly, as illustrated in block 704, the UE 110 initiates a communication session with the IMS network 102. At block 706, the PUID, for example, PUID-A identifying a persona profile associated with account A 510, can be inserted into the originating communication session record. As the communication session is active, each network element 114, if applicable, can generate a CDR, as illustrated in block 708. The CDRs generated by the network elements 114 can be sent to the UDPS 116. The UPDS 116 can aggregate the CDRs into a UUR 400, as illustrated in block 710. At block 712, the UUR 400 can be sent to the charging and rating systems 118. A rating module can determine the rate at which to charge for the service(s) provided as identified by the UUR 400 and the charging and rating systems 118 can generate a charge, at block 714. At block 716, the charging and rating system 118 can send the charge to the router 122. The router 122 can analyze the charge and route the charge to the appropriate billing system 122 based upon the PUID, for example PUID-A or PUID-B, at block 718. At block 720, the billing system 122 receives the charge and posts the charge to the account associated with the PUID, account A 510 or account B 512, for example. The billing system 122 can generate an invoice reflecting the charges and send the invoice to the customer 502 via any known method of invoice delivery, at block 722. The method 700 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
receiving, at a first network element of a network, a message to initiate a session of a communication service at a user device, the user device associated with a plurality of billing accounts, wherein the message includes a particular identifier of multiple identifiers associated with the user device, wherein each respective billing account of the plurality of billing accounts is associated with a respective identifier of the multiple identifiers associated with the user device, and wherein the particular identifier is associated with a particular billing account of the plurality of billing accounts, and wherein the particular identifier is selected from among the multiple identifiers responsive to a user input at the user device designating a user profile, the user profile including the multiple identifiers;
responsive to the receiving the message, initiating the session of the communication service via the first network element; and
responsive to the receiving the message, retrieving from the message the particular identifier and sending, from the first network element to a usage data processing system, a charge data record, the charge data record including the particular identifier, wherein the usage data processing system aggregates charge data records including the particular identifier for the session from multiple network elements used during the session to enable the session to be billed to the particular billing account corresponding to the particular identifier.

2. The method of claim 1, wherein the network comprises an internet protocol multimedia subsystem network.

3. The method of claim 2, wherein the internet protocol multimedia subsystem network provides access to a wireless access network, a packet-switched network, a circuit-switched network, or combinations thereof.

4. The method of claim 1, wherein the user device comprises a subscriber identity module in a slot interface, and wherein the particular identifier is independent of the subscriber identity module.

5. The method of claim 1, wherein a first billing account of the plurality of billing accounts is a work account.

6. The method of claim 1, wherein a first billing account of the plurality of billing accounts is a personal account.

7. The method of claim 1, wherein the first network element comprises a call session control function server.

8. The method of claim 1, wherein the network elements include call session control function servers, breakout gateway control function servers, media gateway control function servers, media resource gateway function servers, application servers, or combinations thereof.

9. The method of claim 1, wherein the user device comprises a mobile communication device.

10. The method of claim 1, wherein the particular identifier comprises a session initiation protocol uniform resource identifier, a telephone uniform resource identifier, or a combination thereof.

11. An apparatus comprising:
a processor; and
a memory coupled to the processor, the memory storing instructions executable by the processor to perform operations, the operations including:
receiving a message to initiate a session of a communication service at a user device via a network, the user device associated with a plurality of billing accounts, wherein the message includes a particular identifier of multiple identifiers associated with the user device, wherein each respective billing account of the plurality of billing accounts is associated with a respective identifier of the multiple identifiers, and wherein the particular identifier is associated with a particular billing account of the plurality of billing accounts, and wherein the particular identifier is selected from among the multiple identifiers according to a user input received at the user device designating a user profile, the user profile including the multiple identifiers;

responsive to the message, initiating the session of the communication service; and responsive to the message, retrieving from the message the particular identifier and sending, to a usage data processing system, a charge data record, the charge data record including the particular identifier, wherein the usage data processing system aggregates charge data records including the particular identifier for the session from multiple network elements used during the session to enable the session to be billed to the particular billing account corresponding to the particular identifier.

12. The apparatus of claim 11, wherein the particular identifier corresponds to an identifier in the user profile.

13. The apparatus of claim 12, wherein the user input is received via the user device and selects the user profile.

14. The apparatus of claim 11, wherein the user device comprises a subscriber identity module in a slot interface, and wherein the particular identifier is independent of the subscriber identity module.

15. The apparatus of claim 11, wherein the plurality of billing accounts includes a personal account and a work account.

16. A non-transitory computer-readable storage device storing instructions executable by a processor to perform operations, the operations comprising:

receiving a message to initiate a session of a communication service at a user device via a network, the user device associated with a plurality of billing accounts, wherein the message includes a particular identifier of multiple identifiers associated with the user device, wherein each respective billing account of the plurality of billing accounts is associated with a respective identifier of the multiple identifiers, and wherein the particular identifier is associated with a particular billing account, the particular identifier selected by the user device responsive to a user input at the user device to designate a user profile for billing the session;

responsive to the receiving the message, initiating the session; and responsive to the receiving the message, sending, to a usage data processing system, a charge data record, the charge data record including the particular identifier included in the message, wherein the usage data processing system aggregates charge data records which include the particular identifier for the session from multiple network elements used during the session to enable the session to be billed to the particular billing account corresponding to the particular identifier.

17. The non-transitory computer-readable storage device of claim 16, wherein the processor is a component of a call session control function server.

18. The non-transitory computer-readable storage device of claim 16, wherein the network elements include call session control function servers, breakout gateway control function servers, media gateway control function servers, media resource gateway function servers, application servers, or combinations thereof.

19. The non-transitory computer-readable storage device of claim 16, wherein the user device comprises a voice over internet protocol telephone, a mobile communication device, a computer, a media device, a television, or combinations thereof.

20. The non-transitory computer-readable storage device of claim 16, wherein the plurality of billing accounts includes a work account and a personal account.

* * * * *